May 29, 1934. K. W. PAULSON 1,960,547
CLUTCH MECHANISM
Filed Nov. 9, 1931

Inventor:
Knut W. Paulson,
By Wilkinson, Huxley, Byron & Knight
attys.

Patented May 29, 1934

1,960,547

UNITED STATES PATENT OFFICE 1,960,547

CLUTCH MECHANISM

Knut W. Paulson, Chicago, Ill.

Application November 9, 1931, Serial No. 573,770

10 Claims. (Cl. 192—46)

The present invention relates to clutch mechanisms and more in particular to free wheel clutches.

Among the objects of the present invention is to provide a novel clutch mechanism which will satisfactorily transmit heavy loads between power elements in a driving device and which will further act freely to cause disengagement of this power drive upon relative movement of the driving elements.

Another object of the present invention is to provide a neatly and compactly arranged clutch mechanism of the free wheeling type which may be readily applied to motor or power driven vehicles, such as automobiles and the like.

Another object within the purview of the present invention is to provide a free wheel clutch for automotive vehicles and the like and which may be installed during the assembly thereof or at a later date, as desired.

The present invention comprehends the idea of providing a clutch mechanism for automotive vehicles and the like which includes means whereby the same may be used as a positive clutch mechanism, or as a free wheel clutch, as desired by the operator of the automotive vehicle.

Still another object of the present invention is to provide a novel clutch mechanism of the free wheeling type which is free from objectionable noises and which is free of other than ordinary wear to which the same may be subjected.

The present invention further contemplates the idea of providing a clutch mechanism of the free wheeling type including a positive drive and means controlled by the power and driven elements thereof for controlling the operation of this positive driving means or mechanism.

Other objects, features, capabilities and advantages are comprehended by the invention, as will later appear and as are inherently possessed thereby.

Referring to the drawing.

Figure 1:
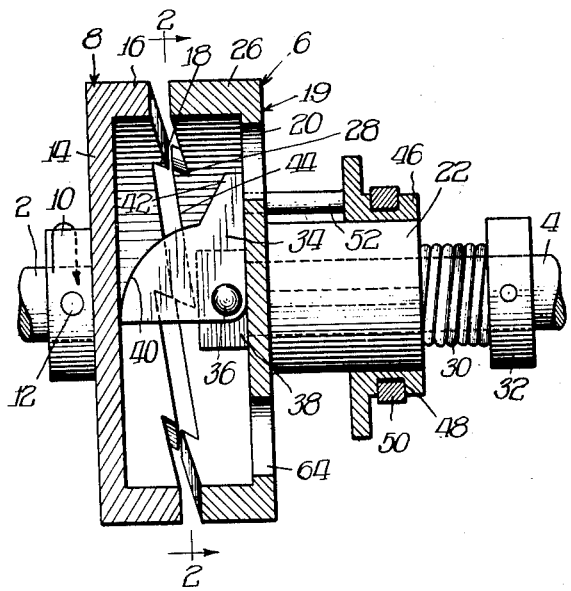
Figure 1 is a fragmentary view in cross section of a clutch mechanism made in accordance with the present invention, the same being taken in a plane represented by line 1—1 of Figure 2 of the drawing.

Referring now more in detail to the drawing, an embodiment selected to illustrate the present invention is shown in association with a power shaft or element 2 of an automotive vehicle or the like, this driving element 2 being in spaced relation with a driven shaft or element 4. The driving shaft or element 2 may extend forwardly and be driven by an internal combustion engine, such as used in an automotive vehicle or the like, while the driven shaft or element 4 may extend rearwardly to the rear axle thereof for driving the vehicle through the rear wheels thereof.

The clutch mechanism of the present invention is generally referred to on the drawing as 6 and comprises a housing 8 provided with a collar or hub 10 secured to the driving shaft or element 2, as by means of a pin or the like 12. This housing 8 includes a wall portion 14 substantially circular in shape, the same being provided with an integral rearwardly extending wall 16 around the rear edge of which is provided a plurality of teeth 18. This clutch mechanism further includes a housing 19 formed with a wall 20 having an integral hub 22 fitting about the driven shaft or element 4, this hub 22 being keyed to the shaft 4 as by means of the key 24 and being adapted to have movement of translation relative to this driven shaft or element 4. The housing 19 is similarly formed with the annular wall 26 integral with the wall 20, the forward face of the annular wall 26 being formed or provided with a plurality of teeth 28 adapted to interengage with the teeth 18 of the housing 8 for effecting a positive drive between the power shaft or element 2 and the driven shaft or element 4.

Figure 3:
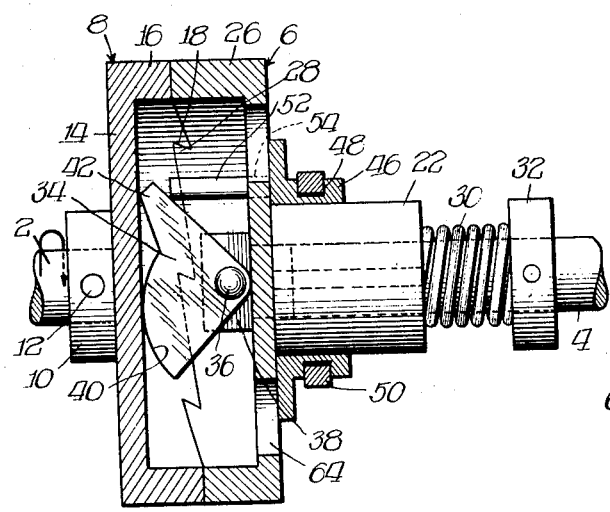
Figure 3 is a fragmentary view in cross section similar to that shown in Figure 1 of the drawing but disclosing the driving elements thereof in operative association.

As clearly shown in Figure 3 of the drawing, the housing 19 is urged, under the impulse of a coil spring 30 interposed between the end of the hub or collar 22 and a collar 32 secured to the shaft 4, toward the housing 8 whereby the teeth 18 and 28 on the housings 8 and 19, respectively, interengage for driving the shaft 4 at the same speed as the speed of the driving shaft 2.

The present invention is concerned primarily with the idea of providing a clutch mechanism which not only has a positive drive between the elements 2 and 4 when the same are rotated at the same speed, but includes the idea of providing suitable means operable to cause a disengagement of the teeth formed on the housings 8 and 19 upon differential movement of rotation between the driving element 2 and the driven element 4. Such means in the present invention is shown as including a plurality of lugs 34 which may be pivotally secured, as by means of pins or pintles 36, to blocks 38 formed integral with or secured to the face of the wall 20 of the housing 19. Each of these lugs 34 is of similar construction and is formed with a curved or cam surface 40 and a projecting element 42. These cam surfaces 40 are of such a construction and width as to be in contact with the wall 14 of the housing 8 at all times. As will be clearly seen in Figure 1 of the drawing, the lugs 34 have been moved into a position to cause a separation of the housings 8 and 19 away from one another whereby the teeth 18 and 28 thereof become disengaged.

Assuming now for example, that the shafts or elements 2 and 4 are at a standstill and are not being rotated for effecting a drive between the power unit and the rear wheels of an automotive vehicle, the housings 8 and 19 would normally be in a closed position, as clearly shown in Figure 3 of the drawing. Assuming now that the driving element 2 is operated to cause rotation of the housing 8 as indicated by the arrow shown in that figure, that is, in a clockwise direction when looking from right to left, it will be quite apparent that because of this positive engagement of the teeth of the housings 8 and 19, the shaft 4 will be driven at the same speed of rotation as shaft 2. If at any time the speed of rotation of the driving shaft or element 2 is caused to be decreased relative to the speed of the driven element 4, there will be a tendency for the teeth 18 to move along the gradually inclined surfaces 44 and to cause a gradual rearward movement of the housing 19 away from the housing 8. During movement of the teeth 18 over the gradually inclined surfaces 44 the lugs 34, because of their frictional engagement with the wall 14 of the housing 8, will be moved about their pivot points 36 from the position as shown in Figure 3 to the position as shown in Figure 1 of the drawing. These lugs 34 therefore act to take up the slack between the housings 8 and 19 and to effectively separate the same when there is differential or relative movement of rotation therebetween.

It will be quite apparent that this disconnection between the teeth 18 and 28 is independently and automatically effected because of the sloping surfaces 44 and the frictional engagement between these housings, as by way of the lugs 34. When the speed of the driven shaft 4 has decreased so as to equal the speed of the driving shaft 2, the frictional engagement between the wall 14 and the cam surfaces 40 of the lugs 34 will cause the lugs 34 to move from their position as shown in Figure 1 of the drawing to that as shown in Figure 3, the coil spring 30 causing movement of housing 19 toward housing 8 whereby the teeth 18 and 28 are again interlocked to effect a positive drive between the elements 2 and 4.

Inasmuch as there has been a growing demand for free wheeling clutch mechanism in automotive vehicles which have not had these mechanisms installed therein at the time of assembly, the present invention further includes the idea of providing a clutch device which may be readily installed therein. Such a device made in accordance with the present invention may, if desired, have means associated therewith for operating this clutch in accordance with free wheeling principles, or as a positive clutch for effecting a positive drive between the two elements in the driving mechanism. Such means is shown as comprising a shipper mechanism having a collar or hub 46 mounted upon the hub 22 of the housing 19, this hub 46 being formed with an annular groove 48 adapted to receive a ring 50 which may be operatively associated with suitable control mechanism conveniently located near the operator's seat, this ring 50, upon operation of this mechanism, being adapted to move the collar 46 upon the hub 22. This hub 46 is formed with projecting arms or rods 52 which protrude through suitable openings 54 in the wall 20 into the space within the housings 8 and 19, the same being adapted to contact with the projecting elements 42 of the lugs 34. It will be clearly seen that upon manual operation of the collar 46, the arms 52 may be moved into or out of engagement with the projecting portions 42 of these lugs 34 whereby the present clutch mechanism may be automatically controlled by differential movement of the elements 2 and 4 or may be maintained in normal engagement because of the inoperative position of the lugs 34. It is of course clearly understood that movement of the collar 46 may be also suitably synchronized with changes in speed of the driving element 2 so that movement of the lugs 34 may be assisted, for effecting an engagement and disengagement of the teeth 18 and 28 when the present clutch is used as a free wheeling clutch mechanism.

Figure 2:
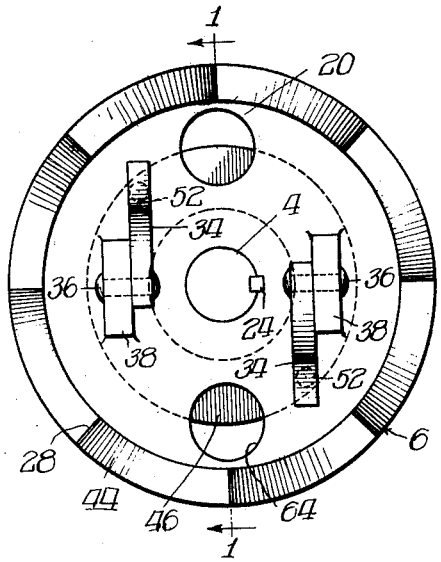
Figure 2 is a view in cross section taken in a plane represented by line 2—2 of Figure 1 of the drawing.
Figure 4:
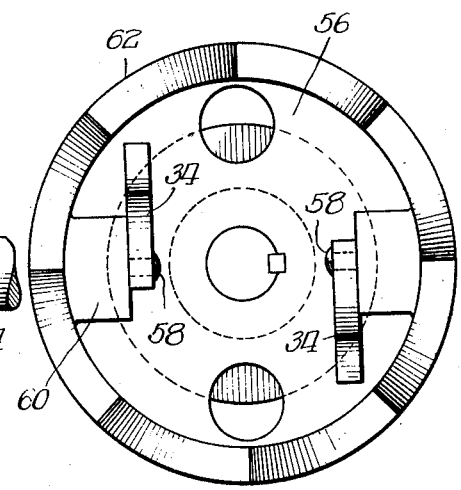
Figure 4 is a view similar to that shown in Figure 2 of the drawing, and disclosing a modified form of the present invention.

In Figure 4 of the drawing, an alternative arrangement is shown for suitably connecting the lugs 34 to a housing, such as 56, which corresponds in construction to the housing 19 as shown in Figures 1 to 3 inclusive. In this embodiment, the lugs 34 may be conveniently carried by means of the pivot pins 58 upon the bosses or supports 60 formed integral with the annular wall 62 of the housing 56, these lugs 34 being moved by frictional engagement with a housing corresponding to the housing 8, for controlling the operation of the driving and driven elements corresponding to the elements 2 and 4, respectively. Further, in each of the embodiments shown in Figures 1 to 3 inclusive and Figure 4, the housings 19 and 56 are shown as being formed with openings 64 adapted to provide vents for the proper circulation of a lubricant.

While I have herein described and upon the drawing shown an illustrated embodiment of the invention, it is to be understood that the invention is not limited thereto but may comprehend other constructions, arrangements of parts, details and features without departing from the spirit of the invention.

I claim:

1. A clutch mechanism comprising a power element including a power shaft having a housing fixed thereto, a driven element including a driven shaft having a housing movably mounted thereon and having relative movement of translation with said first named housing, said housings being provided with interengaging teeth, means for normally urging said teeth into engagement, and means controlled by the relative movement of rotation of said housings for movement of said second named housing to effect engagement and disengagement of said teeth.

2. A clutch mechanism comprising a power element including a power shaft having a housing fixed thereto, a driven element including a driven shaft having a housing movably mounted thereon and having relative movement of translation with said first named housing, said housings being provided with interengaging teeth, means for normally urging said teeth into engagement, and means carried by one of said housings and controlled by the relative movement of rotation of the other for causing movement of translation of said second named housing to effect engagement and disengagement of said teeth.

3. A clutch mechanism comprising a power element including a power shaft having a housing fixed thereto, a driven element including a driven shaft having a housing movably mounted thereon and having relative movement of translation with said first named housing, said housings being provided with interengaging teeth, means for normally urging said teeth into engagement, and a lug carried by said second named housing controlled by the relative movement of rotation of the other of said housings for causing movement of translation of said second named housing to effect engagement and disengagement of said teeth.

4. A clutch mechanism comprising a power element including a power shaft having a housing fixed thereto, a driven element including a driven shaft having a housing movably mounted thereon and having relative movement of translation with said first named housing, said housings being provided with interengaging teeth, means for normally urging said teeth into engagement, and a lug carried by said second named housing and having frictional engagement with the other of said housings, for causing movement of translation of said second named housing to effect engagement and disengagement of said teeth.

5. A clutch mechanism comprising a power element including a power shaft having a housing fixed thereto, a driven element including a driven shaft having a housing movably mounted thereon and having relative movement of translation with said first named housing, said housings being provided with interengaging teeth, means for normally urging said teeth into engagement, and a lug carried by said second named housing controlled by the relative movement of rotation of the other of said housings for causing movement of translation of said second named housing to effect engagement and disengagement of said teeth, and means for manually operating said lug.

6. A clutch mechanism comprising a drive element, a driven element, means for effecting a positive drive between said elements, said means including oppositely disposed members, one of said members being normally urged into association whereby said positive drive is effected, and a lug carried by one of said members and controlled by the relative movement of rotation of said members for causing movement of translation of said movable member to effect engagement and disengagement of said members.

7. A clutch mechanism comprising a drive element, a driven element, means for effecting a positive drive between said elements, said means including oppositely disposed members provided with teeth adapted to engage for effecting said positive drive, and a lug carried by one of said members and controlled by the relative movement of rotation of said members for causing movement of translation of said movable member to effect engagement and disengagement of said teeth.

8. A clutch mechanism comprising a drive element, a driven element, means for effecting a positive drive between said elements, said means including oppositely disposed members, one of said members being normally urged into association whereby said positive drive is effected, and means pivotally connected to one of said members and frictionally engaging the other of said members for effecting an engagement and disengagement of said members, said means being controlled by the relative movement of rotation of said members.

9. A clutch mechanism comprising a drive element, a driven element, means for effecting a positive drive between said elements, said means including oppositely disposed members provided with teeth adapted to engage for effecting said positive drive, and means pivotally connected to one of said members and frictionally engaging the other of said members for effecting an engagement and disengagement of said teeth, said means being controlled by the relative movement of rotation of said members.

10. A clutch mechanism comprising a drive element, a driven element, means for effecting a positive drive between said elements, said means including oppositely disposed members provided with teeth adapted to engage for effecting said positive drive, and a lug pivotally connected to one of said members and frictionally engaging the other of said members for effecting an engagement and disengagement of said teeth, said lugs being controlled by the relative movement of rotation of said members.

KNUT W. PAULSON.